(12) United States Patent
Odum

(10) Patent No.: US 12,415,334 B1
(45) Date of Patent: Sep. 16, 2025

(54) USE OF POLYESTER POWDER IN DECORATIVE ARTICLES AND METHODS RELATED THERETO

(71) Applicant: Shaw Industries Group, Inc., Dalton, GA (US)

(72) Inventor: Tom Odum, Tunnel Hill, GA (US)

(73) Assignee: SHAW INDUSTRIES GROUP, INC., Dalton, GA (US)

( * ) Notice: Subject to any disclaimer, the term of this patent is extended or adjusted under 35 U.S.C. 154(b) by 0 days.

(21) Appl. No.: 18/941,287

(22) Filed: Nov. 8, 2024

Related U.S. Application Data

(60) Provisional application No. 63/597,498, filed on Nov. 9, 2023.

(51) Int. Cl.
| | |
|---|---|
| *B32B 5/16* | (2006.01) |
| *B32B 7/023* | (2019.01) |
| *B32B 7/12* | (2006.01) |
| *B32B 27/08* | (2006.01) |
| *B32B 27/14* | (2006.01) |
| *B32B 27/32* | (2006.01) |
| *B32B 27/36* | (2006.01) |

(52) U.S. Cl.
CPC ............... *B32B 5/16* (2013.01); *B32B 7/023* (2019.01); *B32B 7/12* (2013.01); *B32B 27/08* (2013.01); *B32B 27/14* (2013.01); *B32B 27/32* (2013.01); *B32B 27/36* (2013.01); *B32B 2250/03* (2013.01); *B32B 2250/24* (2013.01); *B32B 2305/30* (2013.01); *B32B 2307/412* (2013.01); *B32B 2323/04* (2013.01); *B32B 2367/00* (2013.01); *B32B 2451/00* (2013.01)

(58) Field of Classification Search
CPC ...................................................... Y02E 20/34
See application file for complete search history.

(56) References Cited

U.S. PATENT DOCUMENTS

| | | | |
|---|---|---|---|
| 12,203,276 B2 | 1/2025 | Odum | |
| 2013/0212046 A1* | 8/2013 | Henshue | B44C 5/0446 427/256 |

FOREIGN PATENT DOCUMENTS

WO   2018057602   3/2018

* cited by examiner

*Primary Examiner* — Lawrence D Ferguson
(74) *Attorney, Agent, or Firm* — Ballard Spahr LLP

(57) ABSTRACT

Described herein are decorative articles comprising decorative portion comprising an image layer formed from an image composition comprising polyester powder. The polyester power functions to provide for an image and also functions as an adhesive to a wear layer. Also described herein are methods for manufacturing same.

30 Claims, 4 Drawing Sheets

USE OF POLYESTER POWDER IN DECORATIVE ARTICLES AND METHODS RELATED THERETO

CROSS-REFERENCE TO RELATED APPLICATIONS

This application claims the benefit of U.S. Provisional Patent Application No. 63/597,498, filed Nov. 9, 2023, the entirety of which is hereby incorporated by reference herein for all purposes.

BACKGROUND

Typically, decorative articles include a base, a decorative layer disposed on the base, and an optional protective layer (a wear layer) above the decorative layer. Traditionally, the decorative layer includes a film with an image printed thereon via rotogravure and offset printing methods. Said films are adhered to the protective layer via a separate tie layer.

Accordingly, there is a need for new and improved decorative articles. Such decorative articles are described herein.

SUMMARY

At least one of the purposes of this disclosure is to provide decorative articles that contain a decorative portion comprising an image layer formed from an image composition that can function as the decorative image and/or an adhesive or tie layer between the decorative portion and a wear layer; and provide a method of making the same.

In accordance with the purpose(s) of this disclosure, disclosed herein is are decorative articles comprising a decorative portion comprising an image layer formed from an image composition comprising polyester powder. The polyester powder can function as the decorative image and/or as an adhesive or tie layer between the decorative portion and a wear layer in the decorative article. Thus, in one aspect, the polyester powder can function both as a decorative image and as an adhesive between the decorative portion and a wear layer in the decorative article. Alternatively, in another aspect, the polyester powder can function as a tie layer between the decorative portion and a wear layer in the decorative article. In yet another aspect, the polyester powder functioning both as a decorative image and as an adhesive between the decorative portion and a wear layer in the decorative article is the only adhesive between the decorative portion and the wear layer.

In one aspect, disclosed herein is a decorative article comprising: a base having a first major surface and a second major surface, wherein the second major surface of the base is opposed to the first major surface of the base; a decorative portion having a first surface and a second surface, wherein the second surface of the decorative portion is opposed to the first surface of the decorative portion, wherein the decorative portion is disposed on the base such that the second surface of the decorative portion faces the first major surface of the base, and wherein the decorative portion comprises an image layer formed from an image composition comprising polyester powder, and a wear layer comprising a polymer having a first surface and a second surface, the second surface of the wear layer being opposed to the first surface of the wear layer, wherein the second surface of the wear layer is adhered to the first surface of the decorative portion by the image layer thereof. In such aspects, the image layer is the only adhesive which adheres the second surface of the wear layer to the first surface of the decorative portion.

In another aspect, disclosed herein is a decorative article comprising: a base having a first major surface and a second major surface, wherein the second major surface of the base is opposed to the first major surface of the base; a decorative portion having a first surface and a second surface, wherein the second surface of the decorative portion is opposed to the first surface of the decorative portion, wherein the decorative portion is disposed on the base such the second surface faces the first major surface of the base, wherein the decorative portion comprises an image layer; a substantially transparent tie layer formed from a tie layer composition comprising polyester powder, wherein the substantially transparent tie layer has a first surface and a second surface, wherein the second surface of the substantially transparent tie layer is opposed to the first surface of the substantially transparent tie layer, wherein the substantially transparent tie layer is disposed on the decorative portion such that the second surface of the substantially transparent tie layer faces the first surface of the decorative portion; and a wear layer comprising a polymer having a first surface and a second surface, the second surface of the wear layer being opposed to the first surface of the wear layer, wherein the second surface of the wear layer is adhered to the first surface of the tie layer by the tie layer composition.

In another aspect, further disclosed herein is a method of making a decorative article comprising the steps of: contacting an image composition comprising polyester powder to a wear layer comprising a polymer; forming an image layer from the image composition, thereby adhering the image layer to the wear layer, wherein the image layer is a part of a decorative portion having a first surface and a second surface, wherein the first surface of the decorative portion is adhered to the wear layer; and attaching the decorative portion to a base such that the second surface of the decorative portion faces the base, thereby forming the decorative article.

In yet another aspect, further disclosed herein is a method of making a decorative article comprising the steps of: contacting a tie layer composition comprising polyester powder to a wear layer comprising a polymer; forming a substantially transparent tie layer from the tie layer composition, thereby adhering the substantially transparent tie layer to the wear layer, wherein the substantially transparent tie layer has a first surface and a second surface, wherein the first surface of the substantially transparent tie layer is adhered to the wear layer; attaching a first surface of a decorative portion comprising an image layer to the second surface of the substantially transparent tie layer, wherein the decorative portion comprises a second surface that is opposed to the first surface of the decorative portion; and attaching the decorative portion to a base such that the second surface of the decorative portion faces the base, thereby forming the decorative article.

Additional aspects of the disclosed decorative articles and methods will be set forth, in part, in the detailed description, and claims which follow, and in part will be derived from the detailed description, or can be learned by practice of the disclosed decorative articles and methods. It is to be understood that both the foregoing general description and the following detailed description are exemplary and explanatory only and are not restrictive of the disclosed decorative articles and methods.

BRIEF DESCRIPTION OF THE FIGURES

These and other features of the aspects of the disclosed decorative articles and methods will become more apparent in the detailed description in which reference is made to the appended drawings wherein.

DETAILED DESCRIPTION

Figure 1:
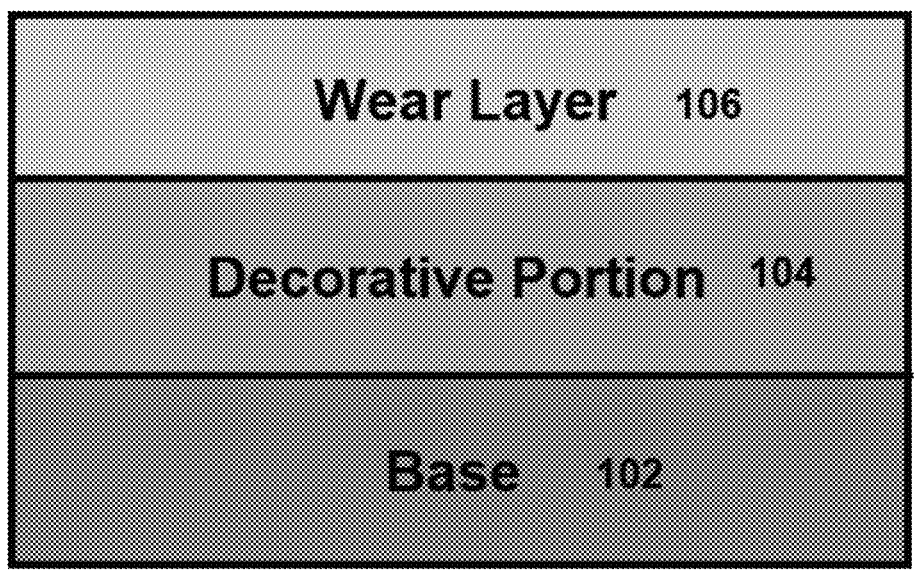
FIG. 1 depicts an exemplary structure of a decorative article disclosed herein.

The present invention can be understood more readily by reference to the following detailed description, examples, drawing, and claims, and their previous and following description. However, before the present articles, devices, systems, and/or methods are disclosed and described, it is to be understood that inventions described and claimed herein are not limited to the specific articles, devices, systems, and/or methods disclosed unless otherwise specified, as such can, of course, vary. It is also to be understood that the terminology used herein is for the purpose of describing particular aspects only and is not intended to be limiting.

The following description of the disclosed decorative articles and methods are provided as an enabling teaching of the invention in its best, currently known embodiment. To this end, those skilled in the relevant art will recognize and appreciate that many changes can be made to the various aspects of the disclosed decorative articles and methods, while still obtaining the beneficial results of the disclosed decorative articles and methods. It will also be apparent that some of the desired benefits of the present invention can be obtained by selecting some of the features of the disclosed decorative articles and methods without utilizing other features. Accordingly, those who work in the art will recognize that many modifications and adaptations to the disclosed decorative articles and methods are possible and can even be desirable in certain circumstances and are a part of the disclosed decorative articles and methods. Thus, the following description is provided as illustrative of the principles of the disclosed decorative articles and methods and not in limitation thereof.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps. Furthermore, it is to be understood that the terms comprise, comprising and comprises as they related to various aspects, elements and features of the disclosed decorative articles and methods also include the more limited aspects of "consisting essentially of" and "consisting of."

As used throughout, the singular forms "a," "an" and "the" include plural referents unless the context clearly dictates otherwise. Thus, for example, reference to "a layer" can include two or more such layers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

As used herein, the term "powder" means any particulate material. The particulate material can comprise or be very fine particles. The particulate material can have a mean average diameter of 1 mm or less, such as a mean average diameter of 0.5 mm or less, 0.3 mm or less, 200 µm or less, 100 µm or less, 75 µm or less, 50 µm or less, 25 µm or less, 20 µm or less, 15 µm or less, 10 µm or less, 7 µm or less, or 5 µm or less. The particulate material can have a mean average diameter of from about 0.5 µm to about 1 µm, from about 1 µm to about 5 µm, from about 2 µm to about 6 µm, from about 5 µm to about 8 µm, from about 5 µm to about 10 µm, from about 2 µm to about 10 µm, from about 2 µm to about 20 µm, from about 2 µm to about 50 µm, from about 2 µm to about 100 µm, from about 10 µm to about 15 µm, from about 15 µm to about 20 µm, from about 20 µm to about 30 µm, from about 30 µm to about 50 µm, from about 50 µm to about 100 µm, from about 10 µm to about 100 µm, from about 30 µm to about 100 µm, from about 20 µm to about 80 µm. from about 30 µm to about 70 µm, from about 50 µm to about 300 µm, from about 100 µm to about 300 µm, from about 150 µm to about 300 µm, or about 0.1 mm to about 0.5 mm. For example, a polyester powder is a particulate material comprising a polyester. The powders can include particles having a variety of shapes and sizes, including generally spherical or irregular shapes, flakes, needle-like particles, chips, fibers, equiaxed particles, etc.

As used herein, "transparent" refers to a property of a material that permits the transmission of light through the material with minimal or no light being absorbed or reflected. "Substantially transparent" refers to a material with a light transmission percentage of at least 50%, at least 60%, at least 75%, at least 80%, at least 85%, at least 90%, at least 95%, or at least 99%. The degree of light transmission can be measured using ASTM D-1003 (Standard Test Method for Haze and Luminous Transmittance of Transparent Plastics). This test method is used to evaluate light transmission and scattering of transparent plastics for a defined sample thickness.

As used herein, the term "tie layer" or "adhesive" refers to a substance which bonds two materials together by adhering to the surface of each material.

A. Decorative Article

In various aspects, the disclosure herein relates to decorative articles. In one aspect, and with reference to FIG. 1, the decorative article can comprise a base (102), a decorative portion (104), and a wear layer (106).

In one aspect, the decorative article can comprise: a base having a first major surface and a second major surface, wherein the second major surface of the base is opposed to the first major surface of the base. In some aspects, the base can comprise at least one base layer, such as at least two base layers. In some aspects, the base comprises one base layer. In further aspects, the base comprises two or more base layers.

The decorative article comprises a decorative portion having a first surface and a second surface, wherein the second surface of the decorative portion is opposed to the first surface of the decorative portion. The decorative portion is disposed on the base such that the second surface of the decorative portion faces the first major surface of the base. The decorative portion comprises an image layer formed from an image composition comprising polyester powder. In one aspect, the polyester in the polyester powder can be polyethylene terephthalate. The image composition forming the image layer can further comprise one or more coloring agents, such a pigment or dye, to provide for a desired color and pattern of the image layer. In one aspect, the decorative portion can further comprise a substrate layer. In one aspect, the image layer can be in disposed on the substrate layer. The substrate layer can be a translucent or opaque film having a color contrasting the color and/or pattern of the image layer. In some examples, the substrate layer can be transparent. In some examples, the substrate layer may have a primer coating applied thereon, the primer coating promoting adhesion of the polyester powder to the substrate layer on which the polyester powder is applied. In some examples, the primer may include, but is not limited to, primers having an aqueous or solvent based chemistry. In another example, the substrate layer can be paper. In some examples where the substrate layer is paper, the substrate layer can be paper that is resin impregnated or not resin impregnated. In another example, the substrate layer can be wood. In some examples where the substrate layer is paper or wood, the substrate layer can be pre-treated with agents which promote application and adhesion of the polyester powder to the substrate layer. An example of pre-treatment of wood or paper substrate layers is corona surface treatment. In other examples where the substrate layer is paper or wood, the decorative portion can comprise at least one additional layer, wherein the image layer is disposed on the at least one additional layer. The at least one additional layer can be an adhesive layer, such as an adhesive layer comprising ethylene-vinyl acetate (EVA) or ethylene-acrylic acid (EAA).

The "image layer formed from an image composition comprising polyester powder" means that an image composition comprising polyester powder is used and applied in the manufacturing of the decorative article and is processed to convert the image composition comprising polyester powder to an image layer. The image layer formed from the image composition comprising polyester powder is not in powder form. The processing to form the image layer from the image composition comprising polyester powder involves applying heat to the image composition comprising polyester powder to melt the image composition comprising polyester powder. Thus, the image layer in a finished product form is typically a melted form of the image composition comprising polyester powder. The process can also include applying pressure during the formation of the image layer, which promotes that the image layer is adhered to a wear layer as described herein. The image composition may further include functional chemistries in addition to the polyester powder. The polyester powder may form a majority element of the image composition.

In some examples, the image composition comprising polyester powder can be applied to the wear layer. The process to form the image layer, which also adheres the image layer to the wear layer, is then performed. This process can be performed prior to attaching the decorative portion, which is adhered to the wear layer, to the base. Such a process can be referred to as back printing. A substrate layer can optionally be attached to the image layer prior to being attached to the base to form the decorative portion of the decorative article. Alternatively, the substrate layer can be attached to the image composition comprising polyester powder prior to the formation of the image layer, i.e., the image layer in the finished product form. In one example, the substrate layer can be formed from a polyester powder and be processed simultaneously in the formation of the image layer. In another example, the substrate layer can be a polyester based film layer. In some examples where the substrate layer is a film layer, the substrate layer may have a primer layer applied thereon.

In another aspect, the image composition comprising polyester powder can be applied to a substrate layer prior to the wear layer being applied to the image composition comprising polyester powder. The wear layer can then be applied on the image composition comprising polyester powder that is present on the substrate layer. As described above, in some examples, the substrate layer may include a primer layer that promotes adhesion of the polyester powder to the substrate. The formation of the image layer in such an alternative would be formed in the presence of both the substrate layer and the wear layer. Such a process can be called front printing. The wear and decorative portion together can then be attached to the base using adhesive. In one example, the adhesive can be roll coated onto the base. In another example, an adhesive formed from a polyester powder can be used between the base and the substrate layer of the decorative portion. The adhesive formed from a polyester powder can be the only adhesive used to adhere the base and the substrate layer of the decorative portion.

In another aspect, the image composition comprising polyester powder can be applied to the base, for example applied to the substrate layer being attached to the base, prior to the wear layer being applied to the image composition comprising polyester powder. The formation of the image layer in such an alternative would be formed in the presence of both the base and the wear layer.

In one aspect, the image composition comprising polyester powder can be applied to the wear layer using a roller that transfers the image composition comprising polyester powder from the roller to the wear layer.

The decorative article comprises a wear layer comprising a polymer having a first surface and a second surface, the second surface of the wear layer being opposed to the first surface of the wear layer. The second surface of the wear layer is adhered to the first surface of the decorative portion by the image layer.

In one aspect, the decorative article can further comprise a scratch layer having a first surface and a second surface. The scratch layer overlies the wear layer such that at least a portion of the second surface of the scratch layer contacts at least a portion of the first surface of the wear layer.

Figure 2:
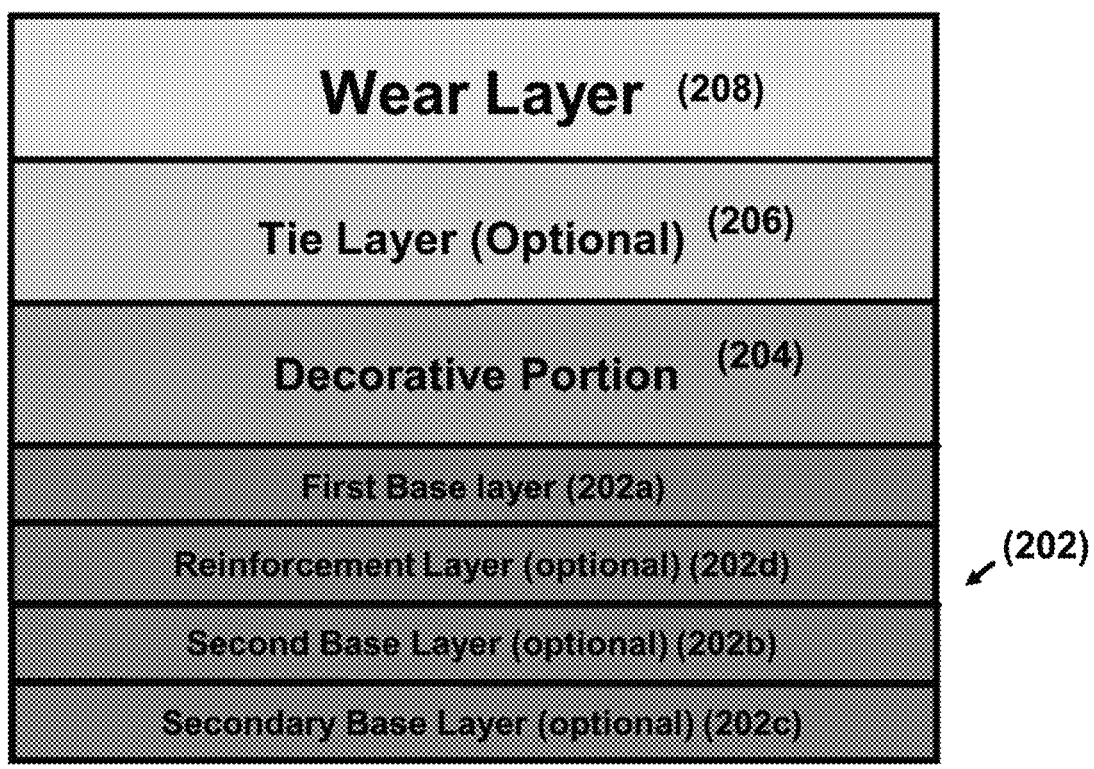
FIG. 2 depicts an exemplary structure of a decorative article disclosed herein.

In another aspect, and with reference to FIG. 2, the decorative article generally can comprises a base (202), a decorative portion (204), a substantially transparent tie layer (206), and a wear layer (208). The difference between the decorative article shown in FIG. 1 and FIG. 2 is that a substantially transparent tie layer (206) is present between the wear layer and the decorative portion in FIG. 2. In the decorative article shown in FIG. 1, the image layer formed from an image composition comprising polyester powder acts as an adhesive to keep the wear layer and the decorative portion connected. In the decorative article shown in FIG. 2, the tie layer formed from a tie layer composition comprising polyester powder acts as an adhesive to keep the wear layer and the decorative portion connected. In the decorative article shown in FIG. 2, the image layer does not have to be, but can be, formed from polyester powder.

As such, in one aspect, the decorative article can optionally comprise a substantially transparent tie layer, see FIG. 2. In those aspects, the substantially transparent tie layer is formed from a tie layer composition comprising polyester powder. In one aspect, the polyester in the polyester powder can be polyethylene terephthalate. The substantially transparent tie layer has a first surface and a second surface, wherein the second surface of the substantially transparent tie layer is opposed to the first surface of the substantially transparent tie layer. When present, the substantially transparent tie layer is disposed on the decorative portion such that the second surface of the substantially transparent tie layer faces the first surface of the decorative portion. In one aspect, the substantially transparent tie layer is fully transparent. In further aspects, the second surface of the wear layer is adhered to the first surface of the tie layer by the tie layer composition and the first surface of the decorative portion is adhered to the second surface of the tic layer by the tie layer composition.

Similar to the formation of the image layer from the image composition comprising polyester powder, the substantially transparent tie layer formed from a tie layer composition comprising polyester powder means that a tie layer composition comprising polyester powder is used and applied in the manufacturing of the decorative article and is processed to convert the tie layer composition comprising polyester powder to a substantially transparent tie layer. The substantially transparent tie layer formed from the tie layer composition comprising polyester powder is not in powder form. The processing to form the substantially transparent tie layer from the tie layer composition comprising polyester powder involves applying heat to the tie layer composition comprising polyester powder to melt the tie layer composition comprising polyester powder. Thus, the substantially transparent tie layer is typically a melted form of the tie layer composition comprising polyester powder. The process can also include applying pressure during the formation of the substantially transparent tie layer. In some aspects, the decorative article can comprise both an image composition comprising polyester powder and a substantially transparent tie layer formed from a tie layer composition comprising polyester powder.

The tie layer composition comprising polyester powder can be applied to the wear layer and the process to form the substantially transparent tie layer can be performed prior to attaching the decorative portion to the base. In such an aspect, the image layer can be applied to the tie layer composition comprising polyester powder prior to the formation of the tie layer. Thus, both the wear layer and the image layer are adhered to the substantially transparent tie layer in this process. In this aspect, the image layer can be, but does not have to be, formed from an image composition comprising polyester powder. In some aspects, the substantially transparent tie layer is the only adhesive used to adhere the wear layer to the image layer.

In one aspect, the decorative article substantially consists of polyester. In a further aspect, the decorative article comprises at least 75%, at least 80%, at least 85%, at least 90%, at least 95%, or at least 99% by weight of polyester. A high weight percentage of polyester in the decorative article can render the decorative article easier and/or more economical to recycle, due to a decreased number of components which have to be separated prior to recycling.

In one aspect, the decorative article substantially consists of polyethylene terephthalate (PET). In such an aspect, the decorative article substantially consists of virgin PET, recycled PET, or a combination thereof. In a further aspect, the base, decorative portion, and the wear layer comprise PET. In a yet further aspect, the substantially transparent tie layer, if present, comprises PET.

In still further aspects, the decorative article described herein can be in any form known in the art. In certain aspects, the decorative article is a rolled good, sheet good, a tile, or a plank. In a further aspect, the decorative article is a surface covering panel. In a yet further aspect, the decorative article is a floor panel or a wall panel. The decorative panel disclosed herein can provide functionality as well as aesthetics. For example, the decorative article can have acoustic reduction properties, moisture resistance, and/or flexibility. When the decorative article disclosed herein is a floor panel, it can provide a comfortable surface to walk on and be present above a sub-surface, such as concrete or other sub flooring materials.

1. Base

In one aspect, the base of the decorative article can have a first major surface and a second major surface, wherein the second major surface is opposed to the first major surface. In another aspect, the base can comprise at least one base layer. In some aspects, the base can comprise a single base layer. In yet other aspects, the base can comprise a plurality of base layers. In certain aspects, when the plurality of base layers is present, a first base layer overlies a second base layer that in turn overlies a third base layer, and so on. In certain aspects, it is contemplated that a last base layer of the plurality of the base layers can define the second major surface of the base. It is further contemplated that a first base layer of the plurality of base layers can define the first major surface of the base. In still further aspects, the at least one base layer can comprise a single base layer. In yet still further aspects, the at least one base layer can comprise a plurality of base layers.

In one aspect, the at least one base layer of the base can comprise one or more first base layers and a secondary base layer. For example, in a further aspect, the at least one base layer of the base can comprise a first base layer, a second base layer, and a secondary base layer. In a still further aspect, the secondary base layer can define the second major surface of the base, and the first and second base layers can be configured to substantially overlie the secondary base layer.

In an exemplary aspect, as shown FIG. 2, in addition to wear layer (208), optional tie layer(s) (206), and the decorative portion (204), the one or more base layers can be formed in the base (202). These one or more base layers can comprise a first base layer (202a) and a second base layer (202b). In this aspect, the first base layer can define the first surface of the base. In other exemplary aspects, the second base layer can define the second surface of the base. In yet further exemplary aspects, if the secondary base layer (202c) is present, the secondary base layer can define the second surface of the base.

In various further aspects, the one or more base layers are formed from and comprise a base composition. In one aspect, the first and second base layers comprise a base composition. In some aspects, the first and second base layers can comprise the same base composition. In other aspects, the first and second base layers can comprise different base compositions.

In certain aspects, the base can comprise additional layers that can be introduced therebetween the first and second base layers. In some exemplary aspects, and as shown in FIG. 2, the base comprises a reinforcement layer (202d). In still further aspects, the reinforcement layer can comprise a non-woven or wet-laid fiberglass scrims, as well as woven and non-woven thermoplastic fabrics (e.g. polypropylene, nylon and polyester). In still further aspects, the reinforcement layer comprises a fiberglass. Without wishing to be bound by a particular theory, the reinforcement layer can increase dimensional stability by reducing the chance for shrinkage or growth after installation of the decorative article.

In some aspects, the base can comprise any base composition that comprises a polyester, a polyamide, a polyvinyl chloride, a polyolefin, a polyurethane, a fiber board, a medium density fiber board, a high density fiber board, an oriented strand board, magnesium oxide, stone plastic composite, wood plastic composite, or any combination thereof. It is further understood, that if a combination of various polymers is present in the base, the relative amount of each polymer in the base composition can be any appropriate amount. In a further aspect, the base can be a renewable polymer core. In a yet further aspect, the base can be a hybrid resilient core.

In some aspects, the base is extruded. In certain aspects, the base is not extruded.

In some aspects, a "polyester" described herein refers to a category of polymers that contain the ester functional group in their main chain. Polyesters disclosed herein include naturally occurring chemicals, such as in the cutin of plant cuticles, as well as synthetics produced through step-growth polymerization. An non-limiting example of polyester components includes any long-chain synthetic polymer composed of at least 85% by weight of an ester of a substituted aromatic carboxylic acid, including but not restricted to substituted terephthalic units, $p(-R—O—CO—C_6H_4—CO—O—)_x$ and parasubstituted hydroxy-benzoate units, $p(-R—O—CO—C_6H_4—O)_x$. In certain examples, the polyester component comprises polyethylene terephthalate (PET) homopolymers and copolymers, polybutylene terephthalate (PBT) homopolymers and copolymers, and the like, including those that contain comonomers such as cyclohexanedimethanol, cyclohexanedicarboxylic acid, and the like.

In other aspects, a "polyamide" as utilized herein, is defined to be any long-chain polymer in which the linking functional groups are amide (—CO—NH—) linkages. The term polyamide is further defined to include copolymers, terpolymers and the like as well as homopolymers and also includes blends of two or more polyamides. An example of polyamide component includes one or more of nylon 6, nylon 66, nylon 10, nylon 612, nylon 12, nylon 11, or any combinations thereof.

In yet other aspects, a "polyolefin" disclosed herein, refers to any class of polymers produced from a simple olefin (also called an alkene with the general formula $C_nH_{2n}$) as a monomer. In some aspects, the polyolefins include, but are not limited to, polyethylene, polypropylene, both homopolymer and copolymers, poly(l-butene), poly(3-methyl-1-butene), poly(4-methyl-1-pentene) and the like, as well as combinations or mixtures of two or more of the foregoing.

In still further aspects, a "polyurethane" described herein refers to any class of polymers composed of a chain of organic units joined by carbamate (urethane, R—O—CO—NR—R) links.

In one aspect, the base can comprise, for example and without limitation, low-density polyethylene (LDPE), linear low-density polyethylene (LLDPE), ethylene methacrylate (EMA), ethylene vinyl acetate (EVA), polyethylene-polypropylene (PE-PP) rubber, conventional thermoplastic elastomers (TPEs), conventional thermoplastic olefins (TPOs), alpha-olefin polyethylene co-polymers, polyethylene terephthalate (PET), ethylene butyl acrylate (EBA), and the like.

In a further aspect, and as disclosed in U.S. patent application Ser. No. 11/963,263, which is incorporated in its entirety by reference herein, the base can comprise substantially linear ethylene polymers and homogeneously branched linear ethylene polymers (i.e., homogeneously branched ethylene polymers), which offer low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra-low density polyethylene (ULDPE). Exemplary base layers formed from the disclosed homogeneously branched ethylene polymers are shown in the figures as first or second base layers.

In still further aspects, the exemplary base materials are disclosed in U.S. patent application Ser. No. 15/048,215, which is incorporated in its entirety by reference herein.

In a further aspect, any disclosed herein base material can be used alone or can be blended or mixed with one or more synthetic or natural polymeric materials. For examples, suitable polymers for blending or mixing with homogeneously branched ethylene polymers used include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra-low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

In a further aspect, the base materials used to prepare at least one of the base layers disclosed herein can comprise a filler. As would be recognized by one of ordinary skill in the art, the type of filler used can be selected on the basis of the desired physical properties of the final product. In a still further aspect, exemplary fillers can include, for example and without limitation, calcium carbonate, barium sulfate, barite, glass fiber and powder, metal powder, alumina, hydrated alumina, clay, magnesium carbonate, calcium sulfate, silica or glass, fumed silica, talc, carbon black or graphite, fly ash, cement dust, feldspar, nepheline, magnesium oxide, zinc oxide, aluminum silicate, calcium silicate, titanium dioxide, titanates, wood flour, glass microspheres, chalk, and mixtures thereof. In a yet further aspect, additional fillers that can be used include graphite fiber, silica/glass, wollastonite, crushed glass cullet, kaolin, mica, recycled fines, fiberglass, diatomaceous earth, lime, and mixtures thereof. In an even further aspect, an exemplary filler is fly ash, such as, for example and without limitation, Celceram™ fly ash filler PV20A (a calcium aluminum silicate available from Boral). In a further aspect, the base can comprise post-industrial carpet and/or post-consumer carpet material.

In a further aspect, the base can comprise a filler in an amount of from about 65% to about 95% by weight, including exemplary filler weight % values of 70% by weight, 71% by weight, 72% by weight, 73% by weight, 74% by weight 75% by weight, 76% by weight, 77% by weight, 78% by weight, 79% by weight, 80% by weight, 85% by weight, 90% by weight, and 94% by weight. In still further aspects, the base can comprise a filler in an amount in a range derived from any two of the above listed exemplary weight percentage values. For example, the base can comprise a filler in a range of from about 70% to about 90% by weight, or from about 75% to about 85% by weight.

In a further aspect, the base can optionally comprise one or more additives, for example and without limitation, a tackifier, a processing agent, a foaming agent, a plasticizer, or the like.

In a further aspect, the secondary base layer, when present, can comprise, for example and without limitation, oriented polypropylene (OPP), woven polyethylene (PE), nonwoven polyethylene (PE), woven polypropylene (PP), nonwoven polypropylene (PP), woven polyethylene terephthalate (PET), nonwoven polyethylene terephthalate (PET), woven nylon, nonwoven nylon, and the like. In a still further aspect, the secondary base layer can comprise nonwoven fiberglass, woven fiberglass, recycled fiber shoddy, polyethylene terephthalate (PET) film, polypropylene (PP) film, polyethylene (PE) film, linear low-density polyethylene (LLDPE) film, polystyrene copolymer, polypropylene-polyethylene (PP-PE) copolymer, polyolefin elastomer, polyvinyl chloride, or polyurethane, or a combination thereof. In a still further aspect, the secondary base layer comprises an embossed pattern.

In a further aspect, the reinforcement layer, when present, can comprise fiberglass layer. In some aspects, the fiberglass layer, when present, can comprise a fiberglass mat. In a still further aspect, the fiberglass layer can comprise a weight of from about 20 to about 90 g/m$^2$, including exemplary values of about 30, 40, 50, 60, 70, or 80 g/m$^2$. In some aspects, the fiberglass mat can allow for increased binder polymer saturation and, thus, a reduction in the chance for delamination from highly filled first and second base layers. In a further aspect, beneficially, a thinner fiberglass mat can reduce the overall weight of the final decorative article and is less expensive than thicker fiberglass.

2. Decorative Portion

The decorative article disclosed herein comprises a decorative portion. In certain aspects, the decorative portion has a first surface and a second surface. In yet other aspects, the second surface of the decorative portion is opposed to the first surface of the decorative portion. In certain aspects, the decorative portion can be disposed on the base such that the second surface of the decorative portion faces the first major surface of the base. In some examples, the decorative article may include additional optional sub layers between the decorative portion and the base such as, but not limited to, acoustic layers, reinforcement layers, stability layers, underfoot comfort improvement layers, etc.

The decorative portion comprises an image layer. The image layer is formed from an image composition comprising polyester powder in all aspects where the wear layer is adhered to the first surface of the decorative portion by the image layer. The image layer can be, but does not have to be, formed from an image composition comprising polyester powder in the aspects where the wear layer is adhered to a tie layer and the tie layer is further adhered to the image layer.

The image composition comprising polyester powder can further comprise a coloring agent, such as a pigment or dye, to provide for the color and resulting image or pattern of the image layer that is visible in the decorative article. The image layer can provide for a desired design. such as a design of a hardwood or ceramic flooring.

The polyester powder can comprise any suitable polyester powder. The polyester powder can comprise polyethylene terephthalate powder. The polyester can be formed from amorphous PET, biaxially oriented PET, PET glycol, recycled PET, virgin PET, or any combination thereof.

The image composition can further comprise additives. The image composition can comprise, for example, anti-caking, performance, or crosslinking agents. The image composition can further comprise an anti-caking agent such as, but not limited to, calcium silicate. The image composition can further comprise a performance additive such as, but not limited to, precipitated silica. The image composition can further comprise a crosslinking agent such as, but not limited to, an organic peroxide, an amine, an amide, a silane, an epoxy, a radical and UV cure monomer, and isocyanate. In some aspects, the polyester powder is the only adhesive component in the image composition. In some aspects, the image composition does not comprise any additives being additional adhesives.

In yet other aspects, the decorative portion can further comprise a substrate layer. In certain aspects, the substrate layer has a first surface and a second surface, wherein the second surface of the substrate layer is opposed to the first surface of the substrate layer. In still further aspects, the image layer can be applied to the first surface of the substrate layer. In certain aspects, the second surface of the substrate layer is the second surface of the decorative portion overlying the first surface of the base. Yet in other aspects, the first surface of the substrate layer can define the second surface of the decorative portion overlying the first surface of the base. In some aspects, the substrate layer may not form the second or first surface of the decorative portion. That is, in said aspects, there may be additional sub-layers below the substrate layer. In still further aspects, the substrate layer is formed from polyester powder. In certain aspects, the polyester powder is polyethylene terephthalate powder. In further aspects, the substrate layer can be formed from thermoplastic polyurethane powder. In still further aspects, the substrate layer can be formed from polyester-epoxy powder.

In a further aspect, the substrate layer can be substantially transparent. In another aspect, the substrate layer can be substantially opaque. In a yet further aspect, the substrate layer can be any color to provide a color contrast to the image layer formed from the image composition comprising polyester powder. In a still further aspect, the substrate layer is white. In a yet still further aspect, the substrate layer is beige. In a yet still further aspect, the substrate layer is brown. In some aspects, the image composition comprising polyester powder can be printed onto the substrate layer using conventional printing methods. The image composition comprising polyester powder can be printed onto the substrate layer using, for example, a printer manufactured by Hewlett-Packard, Xeikon, Ricoh, The Eastman Kodak Company, Seiko Epson Corporation, and Mimaki Engineering Co.

In certain aspects when the substantially transparent tic layer is present, the image layer can be an ink layer applied either directly or indirectly thereto the first surface of the substrate layer. In a further aspect, the ink layer can comprise any conventional ink, dye, pigment, or other marking substance that can be applied within decorative articles in a desired pattern. For example and without limitation, the ink layer can comprise water-based, soy-based, a UV-cured inks, and/or solvent-based pigments. In still further aspect, the ink layer is a UV cured ink.

It is understood that UV-cured inks can comprise photoinitiators, pigments, additives, monomers and oligomers of various polymers, and the like. In some exemplary aspects, the UV-cured inks can comprise, without limitation, (5-ethyl-1,3-dioxan-5yl) methyl acrylate, 2-phenoxyethyl acrylate; 1-vinylhexahydro-2H-azepin-2-one, substituted phosphine oxide, thrimethylolpropane triacrylate, phenyl bis (2,4 6-trimethylbenzoyl) phosphine oxide, epoxy acrylate oligomer, diacrylate monomer, multifunctional monomers, amine modified acrylate oligomer, 1-vinylhexahydro-2H-asepin-2-one, diacrylate oligomers, benzophenone, triacrylate monomers, 1-hydroxy-cyclohexylphenyl-ketone, 2 hydroxy-2-methylpropiophenone, and the like.

In a further aspect, the ink layer can be applied to the substrate layer by any conventional printing means, which can include, without limitation, rotogravure printing, flexography printing, lithography printing, offset-lithography printing, relief printing, thermography printing, thermal sublimation printing, dye-sublimation printing, heat-transfer printing, digital printing, and the like.

In still further aspects, the ink layer applied by a digital printing. In an exemplary aspect, the ink layer can comprise inks and pigments manufactured by Collins Inks, INX Inks, Durst, HP, EFI, Sun Chemical, or Tiger. In yet other aspects, the ink layer can be digitally printed utilizing digital printers manufactured by Cefla, Durst, Hymmen, EFI, Barbaran or Inca.

In certain aspects, the formed ink layer can be a continuous layer that covers substantially all of the first surface of the substrate layer. In yet other aspects, the formed ink layer can be a discontinuous layer that covers only a portion of the first surface of the substrate layer. In yet other aspects, the ink layer can have any desired aesthetic appearance, such as, for example and without limitation, the appearance of simulated hardwood or ceramic flooring.

In certain aspects, the substrate layer can comprise at least one of polyvinyl chloride (PVC), whitened PVC, opaque PVC, oriented polypropylene (OPP), polyolefin (PO), woven polyethylene (PE), nonwoven PE, woven polypropylene (PP), nonwoven PP, woven PET, nonwoven PET, woven nylon, nonwoven nylon, conventional papers, conventional foils, PET foils, or foiled oriented polypropylene. For example, the substrate layer can comprise PET.

In some aspects, the substrate layer comprises a transparent PVC. In yet other aspects, the substrate layer comprises a whitened PVC. In still further aspects, the substrate layer comprises an opaque PVC. It is understood that if whitened substrate layer is used, any whitening agent known in the art can be utilized. It is further understood that the whitening agent disclosed herein can comprise inorganic and/or organic compounds. In yet other aspects, the whitening agent can be a fluorescent whitening agent. In some exemplary aspects, the whitening chemistry comprises titanium dioxide, zinc dioxide, and the like. In some other aspects, the whitening can be also achieved by cavitation.

In further aspects, the substrate layer can comprise one or more of a heat stabilized biaxially-oriented PET (BoPET), amorphous PET (aPET), recycled PET (rPET), polyethylene terephthlate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPS), polycarbonate, polyethylene (PE), or a copolymer thereof.

In certain aspects, the substrate layer has a thickness from about 1 mil to about 20 mil, including exemplary values of about 2 mil, about 3 mil, about 4 mil, about 5 mil, about 6 mil, about 7 mil, about 8 mil, about 9 mil, about 10 mil, about 11 mil, about 12 mil, about 13 mil, about 14 mil, about 15 mil, about 16 mil, about 17 mil, about 18 mil, and about 19 mil. In still further aspects, the substrate layer can have any thickness in a range derived from any two of the above listed exemplary values. For example, the substrate layer can comprise a thickness in a range of from about 1 mil to about 5 mil, or from about 3 mil to about 7 mil. In still further aspects, the substrate layer can be a film.

In further aspects, the image layer can be three dimensional. The image composition comprising polyester powder can form a three-dimensional structure to yield a three dimensional image layer. In a further aspect, in the presence of a three dimensional image layer, the first surface of the wear layer can also be three dimensional. The three dimensional structure can provide for a more natural appearance of the decorative article. In a yet further aspect, in the presence of a three dimensional image layer, the first surface of the scratch layer can also be three dimensional. Such a three dimensional image layer produces a decorative article that has an outer surface that is three dimensional.

The three dimensional structure can made in multiple ways. In one example the polyester powder is applied in a varying thickness to the wear layer. The varying thickness of the polyester powder will create a varying thickness of the image layer during its formation. The varying thickness of the polyester powder can be achieved by sequentially applying layers of polyester powder to designated areas to create the varying thickness. In this aspect, the image layer formed from the image composition comprising polyester powder provides both for a visual (image) and textural design. In another example, a single flat layer of the image composition comprising polyester powder can be applied, and a texture can be embossed into this single layer. The wear layer will have the three dimensional structure formed in the image layer, which is then a part of the decorative article. In this process, a substrate layer can be applied to the image layer to form the decorative portion and the decorative portion and wear layer can then be attached to the base via an adhesive.

In another example, a varying thickness of the image composition comprising polyester powder can be applied on a substrate layer to form a three dimensional structure. A wear layer can then be applied to the image composition comprising polyester powder, thereby transferring the three dimensional structure of the image composition comprising polyester powder to the wear layer. The three dimensional image layer is then formed from the three dimensional structure of the image composition comprising polyester powder.

In another example, the image layer can be formed and adhered to the wear layer as described elsewhere herein. Then at least one additional layer of a three dimensional composition comprising transparent polyester powder can be applied on the first side of the wear layer, which is the opposite side of the image layer being adhered. The three dimensional composition comprising translucent polyester powder can be processed to form a three dimensional texture or build.

3. Optional Tie Layer

The decorative article disclosed herein can further comprise a substantially transparent tie layer formed from a tie layer composition comprising polyester powder. In other aspects, the substantially transparent tie layer has a first surface and a second surface. In still further aspects, the second surface of the substantially transparent tie layer is opposed to the first surface of the substantially transparent tie layer. In yet other aspects, the tie layer is disposed on the decorative portion such that the second surface of the substantially transparent tie layer faces the first surface of the decorative portion. In some aspects, the second surface of the substantially transparent tie layer contacts the first surface of the decorative portion.

It is understood that in certain aspects the substantially transparent tie layer comprising polyester powder is disposed on the decorative portion such that the second surface of the substantially transparent tie layer faces the first surface of the decorative portion to facilitate a bond between the first surface of the decorative layer and the second surface of the wear layer. In some aspects, when the substantially transparent tie layer comprising polyester powder is present, the image layer is formed from an image composition comprises polyester powder. In other aspects, when the substantially transparent tie layer comprising polyester powder is present, the image layer is not formed from an image composition comprising polyester powder. In some examples of said other aspects, the decorative layer may be décor film layer with an image printed thereon.

In one aspect, the substantially transparent tie layer is fully transparent.

In certain aspects, the tie layer has a thickness of about 0.1 mil to about 5 mil, including exemplary values of about 0.5 mil, about 1 mil, about 1.5 mil, about 2 mil, about 2.5 mil, about 3 mil, about 3.5 mil, about 4 mil, and about 4.5 mil. In still further aspects, the tie layer can have any thickness in a range derived from any two of the above listed exemplary values. For example, the tic layer can comprise a thickness in a range of from about 0.5 mil to about 4 mil, or from about 0.1 mil to about 3 mil.

4. Wear Layer

The decorative article disclosed herein comprises a wear layer. In a further aspect, the wear layer comprises a polymer. In certain aspects, the wear layer has a first surface and a second surface. In still further aspects, the second surface of the wear layer is opposed to the first surface of the wear layer. In still further aspects, the second surface of the wear layer is adhered to the first surface of the decorative portion by the image layer. In still further aspects, the second surface of the wear layer is adhered to the first surface of the tie layer by the tie layer composition.

In certain aspects, the wear layer is substantially transparent. In certain aspects, the wear layer is fully transparent.

In yet other aspects, the decorative article does not comprise an additional tie layer between the decorative portion and the wear layer other than the image composition. Instead, the image composition which defines the image layer or image of the decorative article is configured to serve a dual function, i.e., both as (1) a layer that provides the design/image of the decorative article and (2) as a tie layer.

In one aspect, the polymer of the wear layer can comprise, for example and without limitation, conventional ionomers, thermoplastic polyurethane (TPU), polyethylene terephthalate (PET), polyurethane, polypropylene, polytrimethylene terephthalate (PTT), nylon 6, nylon 6,6, polyvinyl chloride (PVC), and the like. In a further aspect, the wear layer can comprise surlyn resin, such as, for example and without limitation, Surlyn® 1706 resin, manufactured by E.I. du Pont de Nemours and Company, Inc. In a still further aspect, the wear layer can comprise heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), high density polyethylene (HDPE), low density polyethylene (LDPE), or a copolymer thereof. In a still further aspect, the polymer in the wear layer comprises polyethylene terephthalate (PET).

In a yet further aspect, the wear layer can have a thickness in the range of from about 2 mil to about 30 mil, including exemplary thickness ranges of from about 2 to about 8 mil, about 9 to about 14 mil, or about 16 to about 30 mil. In a still further aspect, the thickness can be in a range derived from any of the above listed exemplary values. For example, the thickness can in the range of about 4 mil to about 9 mil, or from 4 mil to about 16 mil. In another aspect, the wear layer can be embossed with a desired texture pattern.

In various aspects, the decorative article further comprises a scratch layer having a first surface and a second surface, and wherein the scratch layer overlies the wear layer such that at least a portion of the second surface of the scratch layer contacts at least a portion of the first surface of the wear layer. In one aspect, the scratch layer can comprise polyurethane, or acrylate, or a combination thereof. In a further aspect, the scratch layer can comprise a mixture of reactive monomers and oligomers. In a still further aspect, the scratch layer can comprise functionalized monomers, for example, and without limitation, bifunctional and multifunctional monomers. In an even further aspect, the scratch layer can comprise at least one photoinitiator, or other component to catalyze a reaction among materials present in the scratch layer. In some aspects, the scratch layer comprises a blend of epoxy acrylate oligomers with bifunctional and multifunctional monomers. In still further aspects, the scratch layer is UV-cured scratch layer.

In a further aspect, the scratch layer comprises a surface hardening agent. In a still further aspect, the surface hardening agent can comprises aluminate, alumina, acrylic beads, silica, glass spheres, sol gel alumina, nylon Orgasol, MF silica Optbeads, polyethylene dispersion, silyl acrylic set wet particles, wollastonite, clay, silyl acrylic polysiloxane, sodium silicate, polyvinylidene difluoride (PVDF), silicon carbide, quartz, diamond dust, or a combination thereof. In some aspects, the surface hardening agent is alumina, silica, or a combination thereof.

In a further aspect, the scratch layer has a thickness in the range of from about 0.25 to about 3 mils, including exemplary ranges of from about 0.50 to about 1.25 mils, and 0.50 to about 2.25 mils. In a still further aspect, the surface hardening agent is present in an amount in the range of from about 0.25 weight % to about 15 weight % based upon the total weight of the scratch layer, including exemplary ranges of from about 2 weight % to about 3 weight %, and about 2 weight % to about 10 weight % based upon the total weight of the scratch layer. In some aspects, the surface hardening agent is present in an amount less than or equal to 10 weight %, for example, less than about 9, 8, 7, 6, 5, 4, 3, 2, or 1 weight % based upon the total weight of the scratch layer. In a further aspect, the surface hardening agent comprises particulate material having an average particle size less than or equal to 20 microns, for example, less than or equal to about 15, 10, 9, 8, 7, 6, 5, 4, 3, 2, or 1 micron. In some aspects, the scratch layer is adhered to an underlying wear layer portion by a primer coating layer. In a further aspect, the primer coating layer has a thickness in the range of from about 0.25 to about 1 mil, for example, from about 0.40 to about 0.6 mil.

5. Properties of Decorative Articles

The decorative article disclosed herein can exhibit desired physical and mechanical properties.

In one aspect, the decorative article can exhibits a pull value from 5 to 15 force pounds according to ASTM 3936 between the wear layer and the decorative portion. In some aspects, the decorative article can exhibits a pull value of at least 5 force pounds according to ASTM 3936 between the wear layer and the decorative portion. In one aspect, the decorative article can exhibits a pull value from 5 to 15 according to ASTM 3936 between the wear layer and the substantially transparent tie layer. In some aspects, the decorative article exhibits a pull value of at least 5 force pounds according to ASTM 3936 between the wear layer and the substantially transparent tie layer. In some aspects, the decorative article exhibits a pull value of at least 10 force pounds according to ASTM 3936 between the wear layer and the substantially transparent tie layer.

In one aspect, the decorative article is recyclable.

B. Methods of Making

In various aspects, the present disclosure also provides methods of making the decorative articles described herein. In one aspect, a method of making the decorative articles described herein can comprise forming a composite comprising: a base having a first major surface and a second major surface, wherein the second surface of the backing portion is opposed to the first surface of the base, a decorative portion having a first surface and a second surface, wherein the second surface of the decorative portion is opposed to the first surface of the decorative portion, wherein the decorative portion is disposed on the base such that the second surface of the decorative portion faces the first major surface of the base, and wherein the decorative portion comprises an image layer formed from an image composition comprising polyester powder, and a wear layer comprising a polymer having a first surface and a second surface, the second surface of the wear layer being opposed to the first surface of the wear layer, wherein the second surface of the wear layer is adhered to the first surface of the decorative portion by the image layer.

In another aspect, a method of making the decorative articles described herein can comprise forming a composite comprising: a base having a first major surface and a second major surface, wherein the second major surface of the base is opposed to the first major surface of the base, a decorative portion having a first surface and a second surface, wherein the second surface of the decorative portion is opposed to the first surface of the decorative portion, wherein the decorative portion is disposed on the base such that the second surface faces the first major surface of the base, wherein the decorative portion comprises an image layer, a substantially transparent tie layer formed from a tie layer composition comprising polyester powder, wherein the substantially transparent tie layer has a first surface and a second surface, wherein the second surface of the substantially transparent tie layer is opposed to the first surface of the substantially transparent tie layer, wherein the substantially transparent tie layer is disposed on the decorative portion such that the second surface of the substantially transparent tie layer faces the first surface of the decorative portion, and a wear layer comprising a polymer having a first surface and a second surface, the second surface of the wear layer being opposed to the first surface of the wear layer, wherein the second surface of the wear layer is adhered to the first surface of the substantially transparent tie layer by the tie layer composition.

In yet another aspect, a method of making the decorative articles described herein can comprise forming a composite, which parts and components are described herein.

In another aspect, the method of making the decorative articles described herein can comprise contacting an image composition comprising polyester powder to a wear layer comprising a polymer. In a further aspect, the method of making the decorative articles described herein can comprise forming an image layer from the image composition, thereby adhering the image layer to the wear layer, wherein the image layer is part of a decorative portion having a first surface and a second surface, wherein the first surface of the decorative portion is adhered to the wear layer and attaching the decorative portion to a base such that the second surface of the decorative portion faces the base, thereby forming the decorative article.

In another aspect, the method of making the decorative articles described herein can comprise contacting a substrate layer comprising an image composition comprising polyester powder to a wear layer comprising a polymer. In a further aspect, the method of making the decorative articles described herein can comprise forming an image layer from the image composition, thereby adhering the image layer to the wear layer, wherein the substrate layer and the image layer are part of a decorative portion having a first surface and a second surface, wherein the first surface of the decorative portion is adhered to the wear layer and attaching the decorative portion to a base such that the second surface of the decorative portion faces the base, thereby forming the decorative article.

In another aspect, the method of making the decorative articles described herein can comprise contacting a tie layer composition comprising polyester powder to a wear layer comprising a polymer. In a still further aspect, the method of making the decorative articles described herein can comprise forming a substantially transparent tie layer from the tie layer composition, thereby adhering the substantially transparent tie layer to the wear layer, wherein the substantially transparent tie layer has a first surface and a second surface, wherein the first surface of the substantially transparent tie layer is adhered to the wear layer; attaching a first surface of a decorative portion comprising an image layer to the second surface of the substantially transparent tie layer, wherein the decorative portion comprises a second surface that is opposed to the first surface of the decorative portion; and attaching the decorative portion to a base such that the second surface of the decorative portion faces the base, thereby forming the decorative article.

In another aspect, the method of making the decorative articles described herein can comprise contacting a tie layer composition comprising polyester powder to a wear layer comprising a polymer. In a still further aspect, the method of making the decorative articles described herein can comprise forming a substantially transparent tic layer from the tie layer composition, thereby adhering the substantially transparent tic layer to the wear layer, wherein the substantially transparent tie layer has a first surface and a second surface, wherein the first surface of the substantially transparent tie layer is adhered to the wear layer; attaching a first surface of a decorative portion comprising a substrate layer and an image layer to the second surface of the substantially transparent tic layer, wherein the decorative portion comprises a second surface that is opposed to the first surface of the decorative portion; and attaching the decorative portion to a base such that the second surface of the decorative portion faces the base, thereby forming the decorative article.

It is further understood that in some aspects, forming the image layer from the image composition comprising polyester powder comprises applying heat. The formation of the image layer from the image composition comprising polyester powder can comprise applying heat and pressure. Applying heat and optionally pressure facilitates melting and crosslinking of polyester powder. In aspects where pressure is applied, the applied pressure can be from about 0.01 to about 2 MPa. When the polyester powder is cured at an elevated temperature, the polyester powder melts and chemically reacts to form a higher molecular weight polymer in a network-like structure. Such a crosslinking process achieves the desired properties of the image layer having dual functionality as an adhesive and the decorative image for the decorative article.

In some aspects, heat is applied to the image composition at a temperature of from about 90° C. to about 300° C. In a further aspect, heat is applied to the image composition at a temperature of from about 175° C. to about 350° C. In a further aspect, heat is applied to the image composition at a temperature of from about 200° C. to about 350° C. In a further aspect, heat is applied to the image composition at a temperature of from about 250° C. to about 350° C. In a further aspect, heat is applied to the image composition at a temperature of from about 150° C. to about 300° C. In a yet further aspect, heat is applied to the image composition at a temperature of from about 150° C. to about 275° C. In a still further aspect, heat is applied to the image composition at a temperature of from about 200° C. to about 300° C. In a yet further aspect, heat is applied to the image composition at a temperature of from about 250° C. to about 275° C. In a yet further aspect, heat is applied to the image composition at a temperature of from about 50° C. to about 275° C. In a yet further aspect, heat is applied to the image composition at a temperature of from about 100° C. to about 200° C. In a yet further aspect, heat is applied to the image composition at a temperature of from about 150° C. to about 250° C.

In certain aspects, pressure is applied during the formation of the image layer from the image composition comprising polyester powder. Pressure and heat can be applied simultaneously. The pressure applied can be from about 0.01 to about 2.0 MPa. For example, the pressure applied can be from about 0.5 to 2.0 MPa, from about 1.0 to 2.0 MPa, about 0.1 to 1.0 MPa, about 0.05 to 0.05 MPa, or from 0.3 to 1.5 MPa.

In some aspects, heat is applied to the image composition for a curing time of from about 1 second to about 10 seconds. In a further aspect, heat is applied to the image composition for a curing time of about 1 second to about 8 seconds. In a further aspect, heat is applied to the image composition for a curing time of about 1 second to about 5 seconds. In a further aspect, heat is applied to the image composition for a curing time of about 1 second to about 4 seconds. In a further aspect, heat is applied to the image composition for a curing time of about 1 second to about 3 seconds. Heat can be applied to the image composition between rollers to melt the polyester powder.

In some aspects, the image composition can be preheated, for example by using infrared (IR) heat. In such aspects, IR heating can improve heat transfer onto the image composition during curing.

In still further aspects, the method of making the decorative articles described herein can comprise first a step of printing a digital image on a substrate layer to form the image layer, wherein a tie layer formed from a tie layer composition comprising polyester powder is present and overlies the image layer, wherein the substrate layer is present in the decorative portion and wherein the substrate layer has a first surface and a second surface, wherein the second surface of the substrate layer is opposed to the first surface of the substrate layer, wherein the image layer is applied to the first surface of the substrate, and wherein the second surface of the substrate layer is the second surface of the decorative portion, and then attaching the decorative portion to a base such that the second surface of the decorative portion faces the base, thereby forming the decorative article.

Figure 4:
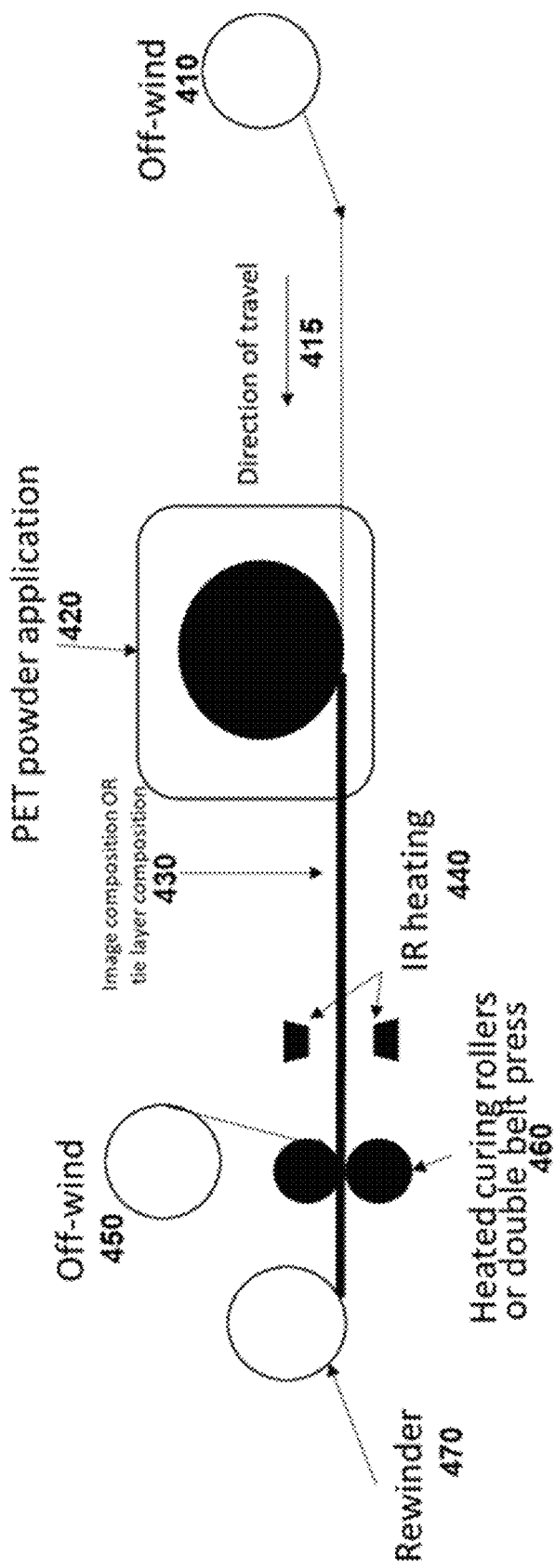
FIG. 4 depicts an exemplary manufacturing methodology for forming an image layer in the disclosed decorative articles.

Referring now to the particular example illustrated in FIG. 4, an exemplary system for applying image compositions or tic layer compositions. In one aspect, a substrate layer is rolled off roll 410 and travels in direction 415 to PET powder application 420, which disposes the PET powder onto the substrate layer. Optionally, the substrate layer and the an image composition 430 can be subjected to IR pre-heating by IR-heating elements 440. Next, a wear layer comprising a polymer is rolled through off roll 450, and the image composition comprising polymer powder is contacted to the wear layer comprising a polymer via heated curing rollers 460. Heat and pressure are applied to the substrate layer, image composition, and wear layer to form an image layer from the image composition, thereby adhering the image layer to the wear layer. The substrate layer and the image composition together is considered a decorative portion, as described herein. Alternatively, 460 can be a double belt press. This allows for longer dwell times of the curing if needed. The formed product is rolled onto roll 470 for storage and further processing.

In one aspect, a wear layer comprising a polymer is rolled off roll 410 and travels in direction 415 to PET powder application 420, which contacts an image composition comprising polyester powder to the wear layer. Optionally, the wear layer and an image composition 430 can be subjected to IR pre-heating by IR-heating elements 440. Next, a substrate layer is optionally rolled off roll 450 onto the image composition, and heat and pressure are applied to the wear layer, image composition, and substrate layer using heated curing rollers 460 to form an image layer from the image composition, thereby adhering the image layer to the wear layer. The substrate layer and the image composition together is considered a decorative portion, as described herein. The formed product is rolled onto roll 470 for storage and further processing.

In one aspect, a wear layer comprising a polymer is rolled off roll 410 and travels in direction 415 to PET powder application 420, which contacts a tie layer composition comprising polyester powder to the wear layer. Optionally, the wear layer and the tic layer composition 430 can be subjected to IR pre-heating by IR-heating elements 440. Next, a decorative portion is rolled off roll 450, and heat and pressure are applied to the wear layer, tic layer composition, and decorative portion using heated curing rollers 460 to form a substantially transparent tie layer from the tie layer composition, thereby adhering the substantially transparent tie layer to the wear layer and the substantially transparent tie layer to the decorative portion. The formed product is rolled onto roll 470 for storage and further process.

In one aspect, a decorative portion is rolled off roll 410 and travels in direction 415 to PET powder application 420, which contacts a tie layer comprising polyester powder to the image layer. Optionally, the decorative portion and the tie layer composition 430 can be subjected to IR pre-heating by IR-heating elements 440. Next, a wear layer comprising a polymer is rolled off roll 450, and heat and pressure are applied to the decorative portion, tie layer composition, and wear layer using heated curing rollers 460 to form a substantially transparent tie layer from the tie layer composition, thereby adhering the substantially transparent tie layer to the wear layer and the substantially transparent tie layer to the decorative portion. The formed product is rolled onto roll 470 for storage and further process.

In various aspects, attaching the decorative portion to the base comprises attaching the decorative portion to the base via an adhesive. Tie layers described herein can comprise an adhesive composition. It is understood that the adhesive can comprise any desired adhesives. In a further aspect, the adhesive can comprise at least one of: ethylene-acrylic acid-maleic anhydride (EAA-MAH), ethylene-methyl acrylate-maleic anhydride (EMA-MAH), ethylene-vinyl acetate (EVA), ethylene-acrylic acid-maleic anhydride (EAA-MAH), ethylene-methyl acrylate (EMA), ethylene-vinyl acetate (EVA), polyurethane (PUR), polyurethane dispersion (PUD), or acrylic adhesive. In a still further aspect, the adhesive can comprise a film or powder.

In various aspects, the disclosed layers of the decorative articles can be constructed or otherwise formed by conventional methods and/or processes. Similarly, it is contemplated that the respective layers can be connected to each other in sequential or non-sequential order. Unless otherwise stated, no particular order of operative steps for product formation is required to make the disclosed decorative article. It is further contemplated that any conventional means of forming or joining layers of a layered construct such as the exemplified decorative article can be used, to include, without limitation, extrusion, lamination, combinations of the same, and the like. Finally, it is contemplated that after the layers of the decorative article are joined together, the resulting sheet can be cut into desired shapes and desired sizes, for example, and without limitation, into a roll goods, plank or tile shapes that can be conventionally or non-conventionally sized and/or shaped.

As disclosed herein, in one aspect, the materials that are selected for the respective layers of the decorative article can be readily recycled. It is contemplated that one or more of the respective layers of the can comprise recycled post-consumer and/or post-industrial materials, such as, for example and without limitation, recycled post-industrial carpet and/or post-consumer carpet polymeric materials. In this aspect, the decorative article can minimize use of virgin materials and advantageously allow for the use of previously recycled materials in forming the decorative article.

In one aspect, the base comprises a first base layer. The first base layer can be, for example and without limitation, extruded or molded. In a further aspect, a second base layer can be a part of the base and can be an extruded layer. In a yet further aspect, the second base layer can be a molded layer. Referring to FIG. 2, in one example, the respective first base layer and second base layer can comprise the base described herein. Next, if desired, a secondary base, such as the exemplified non-woven polypropylene secondary backing, can be extruded thereon or otherwise connected to the bottom surface of the second base.

The formation of the image layer and adhering it to the wear layer can be done by a heated press, such as a heated rolling press or heated static press. In another example, the formation of the image layer and adhering it to the wear layer can be done by heating the image composition in an oven to melt the image composition and in a subsequent step apply pressure using a press, such as a static press or rolling press. In some examples, the heat and pressure may be applied simultaneously.

Figure 3:
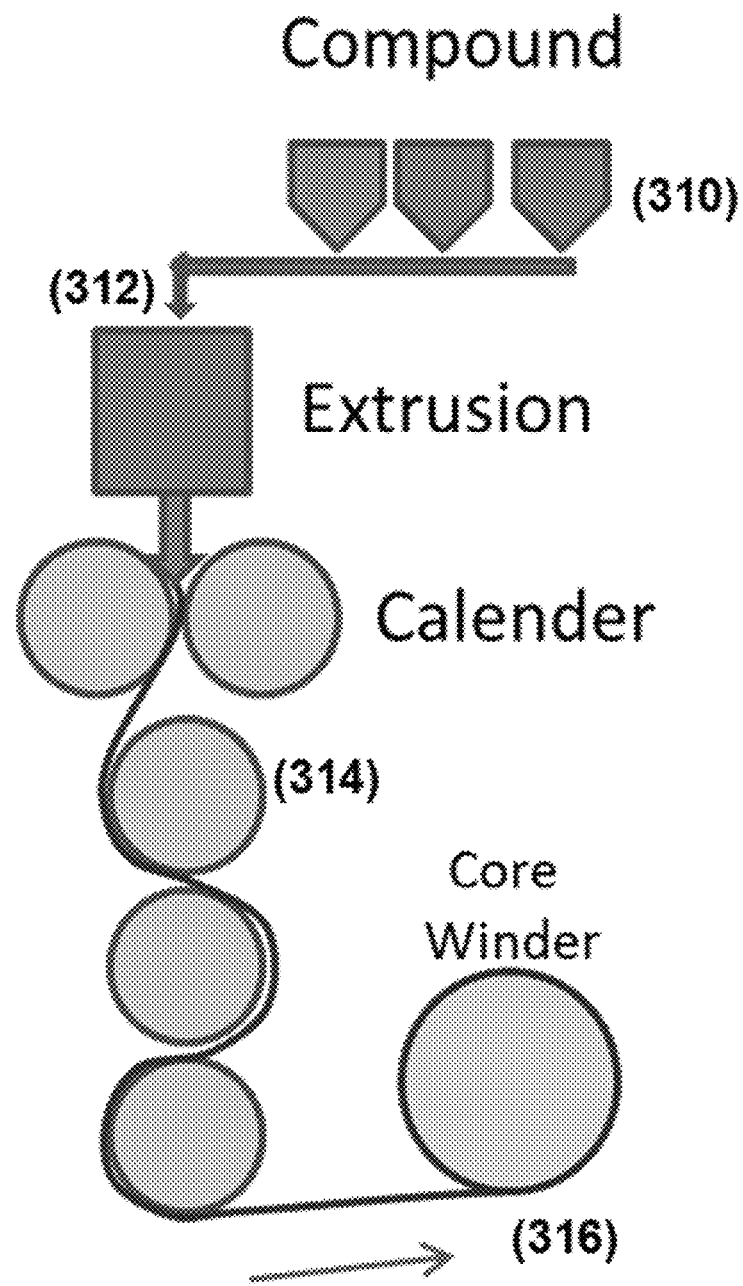
FIG. 3 depicts an exemplary manufacturing methodology for producing a base to be a part of the disclosed decorative article.

Referring now to the particular example illustrated in FIG. 3, an exemplary system for producing the base is shown. Here, the base composition is compounded (310), extruded (312), and rolled through a calendar (314) to form the base. The formed base is then wound by the core winder (316) into rolls, which can later be used to produce the disclosed decorative articles.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

ASPECTS

In view of the disclosure herein below are described certain more particularly described aspects of the disclosed decorative articles and methods. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A decorative article comprising:
  a) a base having a first major surface and a second major surface, wherein the second major surface of the base is opposed to the first major surface of the base;
  b) a decorative portion having a first surface and a second surface, wherein the second surface of the decorative portion is opposed to the first surface of the decorative portion,
    wherein the decorative portion is disposed on the base such that the second surface of the decorative portion faces the first major surface of the base, and wherein the decorative portion comprises an image layer formed from an image composition comprising polyester powder, and
  c) a wear layer comprising a polymer having a first surface and a second surface, the second surface of the wear layer being opposed to the first surface of the wear layer,
    wherein the second surface of the wear layer is adhered to the first surface of the decorative portion by the image layer.

Aspect 2: The decorative article of aspect 1, wherein the base comprises a polyester, a polyamide, a polyvinyl chloride, a polyolefin, a polyurethane, a fiber board, or any combination thereof.

Aspect 3: The decorative article of aspect 1 or 2, wherein the decorative portion further comprises a substrate layer having a first surface and a second surface, wherein the second surface of the substrate layer is opposed to the first surface of the substrate layer, and wherein the image layer is applied to the first layer surface of the substrate layer.

Aspect 4: The decorative article of aspect 3, wherein the substrate layer is formed from polyester powder.

Aspect 5: The decorative article of aspect 3 or 4, wherein the second surface of the substrate layer is the second surface of the decorative portion overlying the first surface of the base.

Aspect 6: The decorative article of any one of aspects 3-5, wherein the substrate layer comprises at least one of polyvinyl chloride (PVC), whitened PVC, opaque PVC, oriented polypropylene (OPP), polyolefin (PO), woven polyethylene (PE), nonwoven PE, woven polypropylene (PP), nonwoven PP, woven PET, nonwoven PET, woven nylon, nonwoven nylon, conventional papers, conventional foils, PET foils, or foiled oriented polypropylene.

Aspect 7: The decorative article of any one of aspects 1-6, wherein the polyester powder is polyethylene terephthalate powder.

Aspect 8: The decorative article of any one of aspects 1-7, wherein the decorative article does not comprise a tie layer between the decorative portion and the wear layer.

Aspect 9: The decorative article of any one of aspects 1-8, wherein the wear layer is substantially transparent.

Aspect 10: The decorative article of any one of aspects 1-9, wherein the wear layer comprises at least one of thermoplastic polyurethane (TPU), polyethylene terephthalate (PET), glycol-modified polyethylene terephthalate (PETG), polyurethane, polypropylene, polytrimethylene terephthalate (PTT), polyvinyl chloride (PVC), Nylon 6, or Nylon 6,6.

Aspect 11: The decorative article of any one of aspects 1-10, wherein the wear layer comprises polyethylene terephthalate.

Aspect 12: The decorative article of any one of aspects 1-11, wherein the decorative article further comprises a scratch layer having a first surface and a second surface, and wherein the scratch layer overlies the wear layer such that at least a portion of the second surface of the scratch layer contacts at least a portion of the first surface of the wear layer.

Aspect 13: The decorative article of any one of aspects 1-12, wherein the decorative article substantially consists of polyester.

Aspect 14: The decorative article of any one of aspects 1-13, wherein the image layer is three dimensional.

Aspect 15: The decorative article of aspect 14, wherein the first surface of the wear layer is three dimensional.

Aspect 16: The decorative article of aspect 14 or 15, wherein the decorative article has an outer surface that is three dimensional.

Aspect 17: A decorative article comprising:
a) a base having a first major surface and a second major surface, wherein the second major surface of the base is opposed to the first major surface of the base;
b) a decorative portion having a first surface and a second surface, wherein the second surface of the decorative portion is opposed to the first surface of the decorative portion,
wherein the decorative portion is disposed on the base such that the second surface faces the first major surface of the base, wherein the decorative portion comprises an image layer,
c) a substantially transparent tie layer formed from a tie layer composition comprising polyester powder, wherein the substantially transparent tie layer has a first surface and a second surface, wherein the second surface of the substantially transparent tie layer is opposed to the first surface of the substantially transparent tie layer,
wherein the substantially transparent tie layer is disposed on the decorative portion such that the second surface of the substantially transparent tie layer faces the first surface of the decorative portion, and
d) a wear layer comprising a polymer having a first surface and a second surface, the second surface of the wear layer being opposed to the first surface of the wear layer,
wherein the second surface of the wear layer is adhered to the first surface of the substantially transparent tie layer by the tie layer composition.

Aspect 18: The decorative article of aspect 17, wherein the image layer is formed from an image composition comprising polyester powder.

Aspect 19: The decorative article of aspect 17 or 18, wherein the image layer comprises at least one of polyvinyl chloride (PVC), whitened PVC, opaque PVC, oriented polypropylene (OPP), polyolefin (PO), woven polyethylene (PE), nonwoven PE, woven polypropylene (PP), nonwoven PP, woven PET, nonwoven PET, woven nylon, nonwoven nylon, conventional papers, conventional foils, PET foils, or foiled oriented polypropylene.

Aspect 20: The decorative article of any one of aspects 17-19, wherein the substantially transparent tie layer is fully transparent.

Aspect 21: The decorative article of any one of aspects 17-20, wherein the base comprises a polyester, a polyamide, a polyvinyl chloride, a polyolefin, a polyurethane, a fiber board, a high density fiber board, fiber cement, magnesium oxide, or any combination thereof.

Aspect 22: The decorative article of any one of aspects 17-21, wherein the decorative portion further comprises a substrate layer having a first surface and a second surface, wherein the second surface of the substrate layer is opposed to the first surface of the substrate layer, and wherein the image layer is applied to the first surface of the substrate layer.

Aspect 23: The decorative article of aspect 22, wherein the substrate layer is formed from polyester powder.

Aspect 24: The decorative article of aspect 22 or 23, wherein the substrate layer comprises at least one of polyvinyl chloride (PVC), whitened PVC, opaque PVC, oriented polypropylene (OPP), polyolefin (PO), woven polyethylene (PE), nonwoven PE, woven polypropylene (PP), nonwoven PP, woven PET, nonwoven PET, woven nylon, nonwoven nylon, conventional papers, conventional foils, PET foils, or foiled oriented polypropylene.

Aspect 25: The decorative article of any one of aspects 17-24, wherein the polyester powder is polyethylene terephthalate powder.

Aspect 26: The decorative article of any one of aspects 17-25, wherein the wear layer is substantially transparent.

Aspect 27: The decorative article of any one of aspects 17-26, wherein the wear layer comprises at least one of thermoplastic polyurethane (TPU), polyethylene terephthalate (PET), glycol-modified polyethylene terephthalate (PETG), polyurethane, polypropylene, polytrimethylene terephthalate (PTT), polyvinyl chloride (PVC), Nylon 6, or Nylon 6,6.

Aspect 28: The decorative article of any one of aspects 17-27, wherein the wear layer comprises polyethylene terephthalate (PET).

Aspect 29: The decorative article of any one of aspects 17-28, wherein the decorative article further comprises a scratch layer having a first surface and a second surface, and wherein the scratch layer overlies the wear layer such that at least a portion of the second surface of the scratch layer contacts at least a portion of the first surface of the wear layer.

Aspect 30: The decorative article of any one of aspects 17-29, wherein the decorative article substantially consists of polyester.

Aspect 31: The decorative article of any one of aspects 17-30, wherein the image layer is three dimensional.

Aspect 32: The decorative article of aspect 31, wherein the first surface of the wear layer is three dimensional.

Aspect 33: The decorative article of aspect 31 or 32, wherein the decorative article has an outer surface that is three dimensional.

Aspect 34: A method of making a decorative article comprising the steps of:
- a) contacting an image composition comprising polyester powder to a wear layer comprising a polymer;
- b) forming an image layer from the image composition, thereby adhering the image layer to the wear layer, wherein the image layer is a part of a decorative portion having a first surface and a second surface, wherein the first surface of the decorative portion is adhered to the wear layer; and
- c) attaching the decorative portion to a base such that the second surface of the decorative portion faces the base, thereby forming the decorative article.

Aspect 35: The method of aspect 34, wherein forming the image layer from the image composition comprises applying heat and pressure.

Aspect 36: The method of aspect 34 or 35, wherein forming the image layer from the image composition comprises applying heat.

Aspect 37: The method of any one of aspects 34-36, wherein attaching the decorative portion to the base comprises attaching the decorative portion to the base via an adhesive.

Aspect 38: A method of making a decorative article comprising the steps of:
- a) contacting a tie layer composition comprising polyester powder to a wear layer comprising a polymer;
- b) forming a substantially transparent tie layer from the tie layer composition, thereby adhering the substantially transparent tie layer to the wear layer, wherein the substantially transparent tie layer has a first surface and a second surface, wherein the first surface of the substantially transparent tie layer is adhered to the wear layer;
- c). attaching a first surface of a decorative portion comprising an image layer to the second surface of the substantially transparent tie layer, wherein the decorative portion comprises a second surface that is opposed to the first surface of the decorative portion; and
- d) attaching the decorative portion to a base such that the second surface of the decorative portion faces the base, thereby forming the decorative article.

Aspect 39: The method of aspect 38, wherein forming the substantially transparent tie layer from the tie layer composition comprises applying heat and pressure.

Aspect 40: The method of aspect 38 or 39, wherein forming the substantially transparent tie layer from the tie layer composition comprises applying heat.

Aspect 41: The method of any one of aspects 38-40, wherein attaching the decorative portion to the base comprises attaching the decorative portion to the base via an adhesive.

What is claimed is:

1. A decorative article comprising:
   a) a base having a first major surface and a second major surface, wherein the second major surface of the base is opposed to the first major surface of the base;
   b) a decorative portion having a first surface and a second surface, wherein the second surface of the decorative portion is opposed to the first surface of the decorative portion,
   wherein the decorative portion is disposed on the base such that the second surface of the decorative portion faces the first major surface of the base, and wherein the decorative portion comprises an image layer formed from an image composition comprising polyester powder,
   wherein the decorative portion further comprises a substrate layer having a first surface and a second surface, wherein the second surface of the substrate layer is opposed to the first surface of the substrate layer, and wherein the image layer is applied to the first surface of the substrate layer, wherein the substrate layer is formed from polyester powder, and
   c) a wear layer comprising a polymer having a first surface and a second surface, the second surface of the wear layer being opposed to the first surface of the wear layer,
   wherein the second surface of the wear layer is adhered to the first surface of the decorative portion by the image layer.

2. The decorative article of claim 1, wherein the base comprises a polyester, a polyamide, a polyvinyl chloride, a polyolefin, a polyurethane, a fiber board, or any combination thereof.

3. The decorative article of claim 1, wherein the second surface of the substrate layer is the second surface of the decorative portion overlying the first surface of the base.

4. The decorative article of claim 1, wherein the substrate layer comprises at least one of polyvinyl chloride (PVC), whitened PVC, opaque PVC, oriented polypropylene (OPP), polyolefin (PO), woven polyethylene (PE), nonwoven PE, woven polypropylene (PP), nonwoven PP, woven PET, nonwoven PET, woven nylon, nonwoven nylon, conventional papers, conventional foils, PET foils, or foiled oriented polypropylene.

5. The decorative article of claim 1, wherein the polyester powder comprises polyethylene terephthalate powder.

6. The decorative article of claim 1, wherein decorative article does not comprise a tie layer between the decorative portion and the wear layer.

7. The decorative article of claim 1, wherein the wear layer is transparent.

8. The decorative article of claim 1, wherein the wear layer comprises at least one of thermoplastic polyurethane (TPU), polyethylene terephthalate (PET), glycol-modified polyethylene terephthalate (PETG), polyurethane, polypropylene, polytrimethylene terephthalate (PTT), polyvinyl chloride (PVC), Nylon 6, or Nylon 6,6.

9. The decorative article of claim 1, wherein the wear layer comprises polyethylene terephthalate (PET).

10. The decorative article of claim 1, wherein the decorative article further comprises a scratch layer having a first surface and a second surface, and wherein the scratch layer overlies the wear layer such that at least a portion of the second surface of the scratch layer contacts at least a portion of the first surface of the wear layer.

11. The decorative article of claim 1, wherein the decorative article consists of polyester.

12. The decorative article of claim 1, wherein image layer is three dimensional.

13. The decorative article of claim 12, wherein the first surface of the wear layer is three dimensional.

14. The decorative article of claim 12, wherein the decorative article has an outer surface that is three dimensional.

15. A decorative article comprising:
   a) a base having a first major surface and a second major surface, wherein the second major surface of the base is opposed to the first major surface of the base;
   b) a decorative portion having a first surface and a second surface, wherein the second surface of the decorative portion is opposed to the first surface of the decorative portion,
      wherein the decorative portion is disposed on the base such that the second surface faces the first major surface of the base, wherein the decorative portion comprises an image layer,
   c) a transparent tie layer formed from a tie layer composition comprising polyester powder, wherein the transparent tie layer has a first surface and a second surface, wherein the second surface of the transparent tie layer is opposed to the first surface of the transparent tie layer,
      wherein the transparent tie layer is disposed on the decorative portion such that the second surface of the transparent tie layer faces the first surface of the decorative portion, and
   d) a wear layer comprising a polymer having a first surface and a second surface, the second surface of the wear layer being opposed to the first surface of the wear layer,
      wherein the second surface of the wear layer is adhered to the first surface of the transparent tie layer by the tie layer composition.

16. The decorative article of claim 15, wherein the image layer is formed from an image composition comprising polyester powder.

17. The decorative article of claim 15, wherein the polyester powder comprises polyethylene terephthalate powder.

18. The decorative article of claim 15, wherein the base comprises virgin PET, recycled PET, or a combination thereof.

19. The decorative article of claim 15, wherein the base, the decorative portion, and the wear layer comprises recycled PET.

20. The decorative article of claim 15, wherein the base, the decorative portion, and the wear layer comprises virgin PET, recycled PET, or a combination thereof.

21. The decorative article of claim 15, wherein the base is one of a polyester or polyolefin-based layer, the image layer is an ink layer, and the wear layer is one of a polyester or polyolefin-based layer.

22. The decorative article of claim 21, wherein the ink layer is a cured ink layer which is digitally printed, and the decorative portion further comprises a substrate on which the ink layer is printed, wherein the substrate is one of a polyester or polyolefin-based layer.

23. A decorative article comprising:
   a) a base having a first major surface and a second major surface, wherein the second major surface of the base is opposed to the first major surface of the base;
   b) a decorative portion having a first surface and a second surface, wherein the second surface of the decorative portion is opposed to the first surface of the decorative portion,
      wherein the decorative portion is disposed on the base such that the second surface of the decorative portion faces the first major surface of the base, and wherein the decorative portion comprises an image layer formed from an image composition comprising polyester powder, wherein the polyester powder comprises polyethylene terephthalate powder; and
   c) a wear layer comprising a polymer having a first surface and a second surface, the second surface of the wear layer being opposed to the first surface of the wear layer,
wherein the second surface of the wear layer is adhered to the first surface of the decorative portion by the image layer.

24. A decorative article comprising:
   a) a base having a first major surface and a second major surface, wherein the second major surface of the base is opposed to the first major surface of the base;
   b) a decorative portion having a first surface and a second surface, wherein the second surface of the decorative portion is opposed to the first surface of the decorative portion,
      wherein the decorative portion is disposed on the base such that the second surface of the decorative portion faces the first major surface of the base, and wherein the decorative portion comprises an image layer formed from an image composition comprising polyester powder, and
   c) a wear layer comprising polyethylene terephthalate (PET) having a first surface and a second surface, the second surface of the wear layer being opposed to the first surface of the wear layer,
      wherein the second surface of the wear layer is adhered to the first surface of the decorative portion by the image layer.

25. The decorative article of claim 24, wherein the base comprises virgin PET, recycled PET, or a combination thereof.

26. The decorative article of claim 24, wherein the base, the decorative portion, and the wear layer comprises recycled PET.

27. A decorative article comprising:
   a) a base having a first major surface and a second major surface, wherein the second major surface of the base is opposed to the first major surface of the base;
   b) a decorative portion having a first surface and a second surface, wherein the second surface of the decorative portion is opposed to the first surface of the decorative portion,
      wherein the decorative portion is disposed on the base such that the second surface of the decorative portion faces the first major surface of the base, and wherein the decorative portion comprises an image layer formed from an image composition comprising polyester powder,
   c) a wear layer comprising a polymer having a first surface and a second surface, the second surface of the wear layer being opposed to the first surface of the wear layer,
      wherein the second surface of the wear layer is adhered to the first surface of the decorative portion by the image layer; and
   d) a scratch layer having a first surface and a second surface, and wherein the scratch layer overlies the wear layer such that at least a portion of the second surface of the scratch layer contacts at least a portion of the first surface of the wear layer.

28. The decorative article of claim 27, wherein the base comprises virgin PET, recycled PET, or a combination thereof.

29. The decorative article of claim 27, wherein the base, the decorative portion, and the wear layer comprises recycled PET.

30. A decorative article comprising:
a) a base having a first major surface and a second major surface, wherein the second major surface of the base is opposed to the first major surface of the base;
b) a decorative portion having a first surface and a second surface, wherein the second surface of the decorative portion is opposed to the first surface of the decorative portion,
   wherein the decorative portion is disposed on the base such that the second surface of the decorative portion faces the first major surface of the base, and wherein the decorative portion comprises an image layer formed from an image composition comprising polyester powder, wherein the image layer is three dimensional, and
c) a wear layer comprising a polymer having a first surface and a second surface, the second surface of the wear layer being opposed to the first surface of the wear layer,
   wherein the second surface of the wear layer is adhered to the first surface of the decorative portion by the image layer.

\* \* \* \* \*